United States Patent [19]

Badcock et al.

[11] 4,086,825
[45] May 2, 1978

[54] STEERING COLUMN ASSEMBLIES

[75] Inventors: Sidney C. Badcock, Hornchurch; Joseph L. Dreissiger, Benfleet; Brian J. Holby, Chelmsford; Ronald P. Pardy, Tiptree, all of England

[73] Assignee: Ford Motor Company, Dearborn, Mich.

[21] Appl. No.: 743,030

[22] Filed: Nov. 18, 1976

[51] Int. Cl.² .......................... B62D 1/18; F16D 1/10
[52] U.S. Cl. ...................................... 74/492; 64/11 F; 280/777
[58] Field of Search .................. 74/492, 493; 280/775, 280/777; 64/10, 11 F

[56] References Cited

U.S. PATENT DOCUMENTS

| | | | |
|---|---|---|---|
| 3,472,093 | 10/1969 | Tenniswood | 74/492 |
| 3,492,888 | 2/1970 | Nishimura et al. | 74/492 |
| 3,752,007 | 8/1973 | Blondeleau et al. | 74/492 |
| 3,785,671 | 1/1974 | Salewsky | 74/492 X |
| 3,792,626 | 2/1974 | Durkee et al. | 74/492 |
| 3,921,747 | 11/1975 | Suzuki et al. | 74/492 X |

Primary Examiner—Allan D. Hermann
Attorney, Agent, or Firm—Clifford L. Sadler; Keith L. Zerschling

[57] ABSTRACT

There is provided a steering column assembly in which the steering shaft comprises upper and lower sections, one end of the lower shaft section being adapted to be connected to a steering gear box and one end of the upper section being adapted to be connected to a steering wheel. The other ends of the two steering shaft sections are connected together by an axially slidable joint. A collapsible tube is mounted on the upper section of the steering shaft and the arrangement being such that, in use, in the event of an impact load upon the steering wheel the connection between the sections of the steering shaft is disengaged and the tube collapses whereby energy is absorbed.

1 Claim, 9 Drawing Figures

STEERING COLUMN ASSEMBLIES

BACKGROUND OF THE DISCLOSURE

This invention relates to steering column assemblies for vehicles and is particularly concerned with a steering column assembly capable of absorbing an impact load.

Steering column assemblies are known in which the steering shaft is telescopicopic and in which the sections of the shaft are surrounded by a collapsible tube which is secured at each end to one of the telescopic sections of the steering shaft. In the event of an impact load, the tube collapses on impact and the sections of the steering shaft telescope into one another. Such assemblies are expensive and complicated to manufacture.

BRIEF SUMMARY OF THE DISCLOSURE

The present invention aims to provide an improved steering column assembly in which the telescopic sections of the steering shaft are dispensed with while still retaining the advantages of a collapsible tube.

In the preferred embodiment of this invention, there is provided a steering column assembly in which the steering shaft comprises two sections, one end of one section being adapted to be connected to a steering gear box and one end of the other section being adapted to be connected to a steering wheel, the other ends of said sections being connected together by an axially slidable joint, and in which a collapsible tube is mounted on the said other section of the steering shaft, said tube being secured at only one end to the shaft and the arrangement being such that, in use, in the event of an impact the connection between the sections of the steering shaft is disengaged and the tube collapses.

Preferably, the collapsible tube is mounted in a bracket assembly which is adapted to be connected to the body structure of a vehicle, said tube being axially slidable through said bracket assembly in the event of an impact on the assembly.

The bracket assembly desirably comprises a pair of half shells designed to engage between them the collapsible tube, a channel section adapted to be secured to a vehicle body structure and a bracket designed to be secured to the channel section with the half shells and collapsible tube located between said bracket and channel section. A resilient member is preferably fitted over each of the half shells, said resilient members being gripped between the half shells and the channel section or bracket.

According to the preferred embodiment of the invention, the collapsible tube is provided with a convoluted section which is capable of being axially compressed in the event of an impact on the assembly. The convoluted section is desirably provided at the end of the tube not secured to the steering shaft and is adapted to be secured to the body structure of a vehicle.

BRIEF DESCRIPTION OF THE DRAWINGS

The invention will now be further described, by way of example, with reference to the accompanying drawings, in which.

Figure 9:
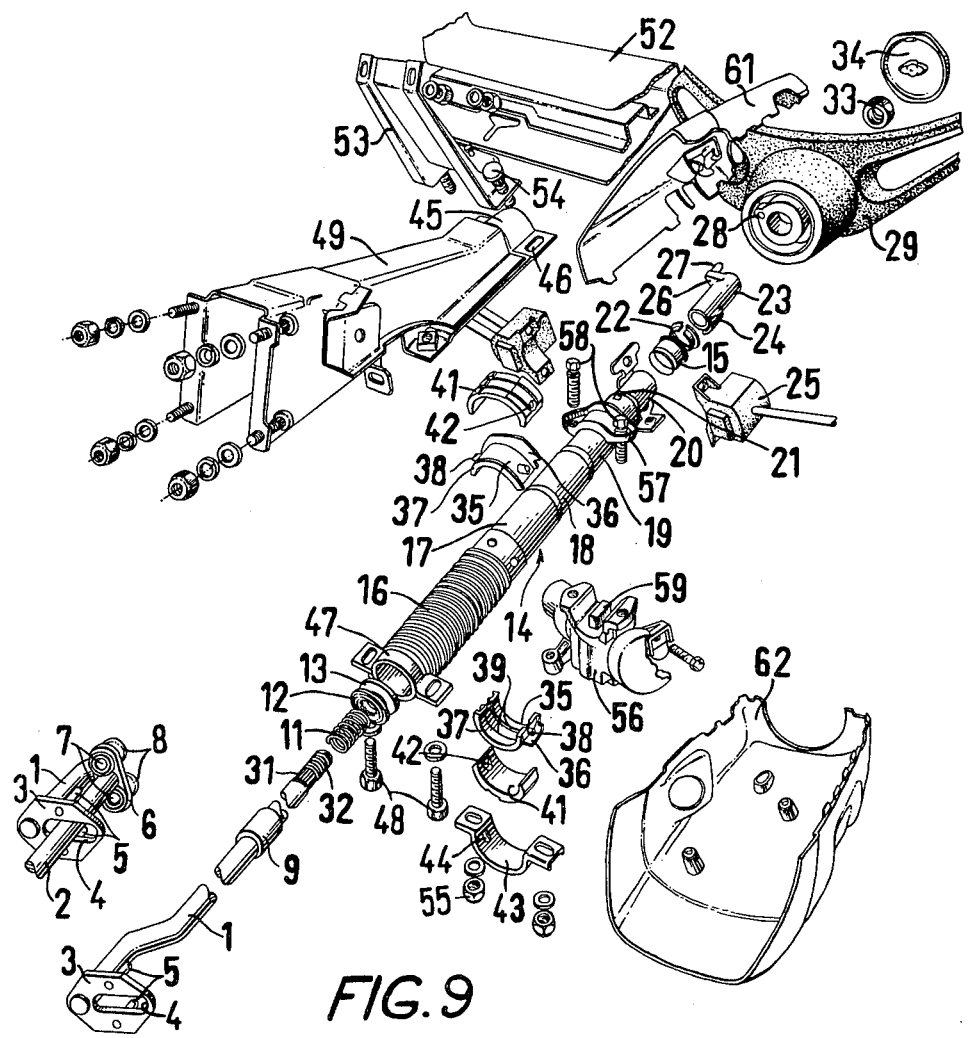
FIG. 9 is an exploded perspective view of a steering column assembly according to the invention together with parts of a vehicle which cooperate with the assembly or to which the assembly is secured.

Various components which are illustrated in FIG. 9 have been omitted from the other figures of the drawings for the sake of clarity.

DETAILED DESCRIPTION OF THE PRESENTLY PREFERRED EMBODIMENT

Referring to the drawings, the steering column assembly comprises a steering shaft having an upper section 1 and a lower section 2. The upper section 1 is provided at its lower end with a plate 3 having an elongated aperture 4 in its central region and a pin 5 projecting from the plate on each side of the aperture. The lower section 2 is passed through the aperture 4 and then a plate 6 having a pair of apertures 7 is secured to the upper end of the section 2. A rubber bush 8 is fitted into each of the apertures and the lower section 2 is then secured to the upper section 1 of the steering shaft by driving the pins 5 through the bushes 8.

Figure 1:
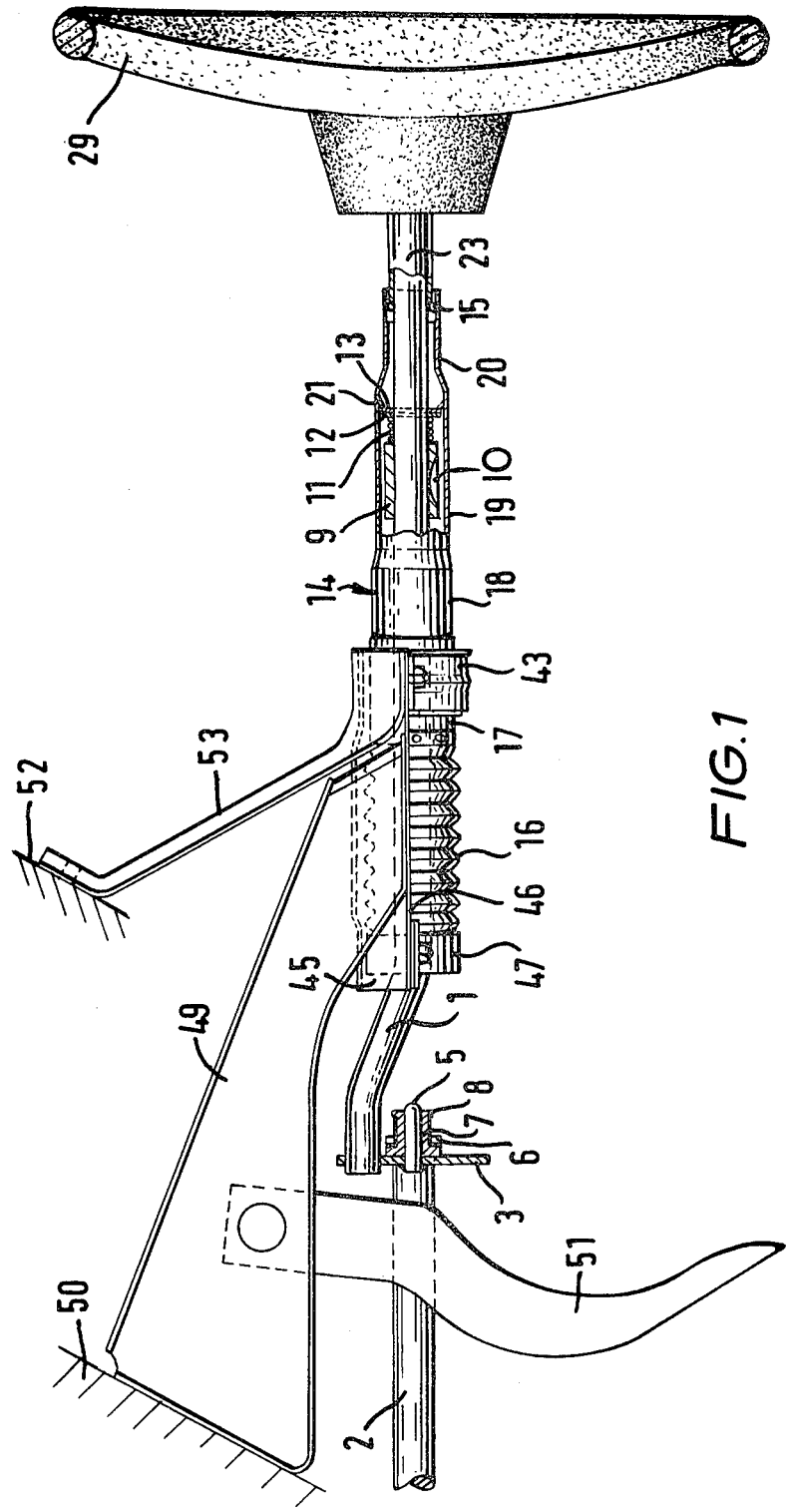
FIG. 1 is a part-sectional side elevation of one embodiment of a steering column assembly installed in a motor vehicle.

As can be seen from FIG. 1, the lower end of the upper section 1 is cranked whereby, when the two sections are assembled together, the lower section 2 represents an axial extension of the major portion of the upper section 1 of the steering shaft. The axially slidable connection above described is sometimes referred to as a "slip-off joint". The lower end of the section 2 is adapted to be connected to a steering gear box (not shown) in a conventional manner.

Fixedly mounted on the upper section 1 adjacent its upper end is a sleeve 9 having a slot 10 formed therein which forms part of a steering column locking mechanism to be hereinafter described. A coil spring 11 is mounted on the section 1 and abuts at one end against the sleeve 9. The spring 11 is followed by a metal washer 12 and a plastic washer 13 and a collapsible tube 14 is then fitted over the section 1. A ball bearing 15 is fitted in the upper end of the tube 14 and the shaft section 1 extends through this bearing. The tube 14 consists of a convoluted section 16 which is secured to a tube section 17 by spot welding and sections 18, 19 and 20 of successively decreasing outer diameter, as can be seen in FIG. 1. Cut outs are made in the shoulder between the sections 19 and 20 of the tube to form inwardly projecting tangs 21 which engage the washer 13 on the shaft section 1. A spring collar 22 is fitted over the shaft section 1 at the end 20 of the tube 14 and a sleeve 23 having a cam 24 is then fitted over the section 1. The cam 24 is provided for cancelling direction indicating signals of a direction indicator unit 25 in known manner. The sleeve 23 is further provided with a radially extending flange 26 from which a pin 27 projects which pin is adapted to engage in a corresponding aperture 28 in a steering wheel 29. The steering wheel 29 is splined to engage with a splined portion 31 of the shaft section 1 and the wheel is secured to the shaft section by a nut 33 which engages with a screw-thread 32 at the end of the shaft section 1. When the nut 33 is tightened, the spring 11 urges the washer 13 against the tangs 21. Finally, a decorative cover 34 is fitted to the steering wheel to conceal the upper end of the steering shaft.

Figure 8:
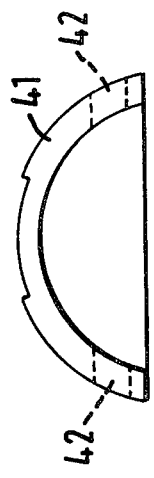
FIG. 8 is an end view of the member shown in FIG. 7.
Figure 6:
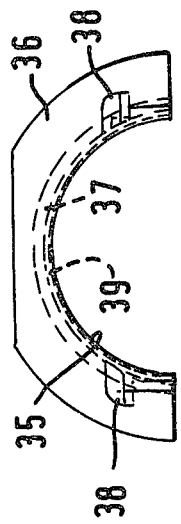
FIG. 6 is an end view of the half shell shown in FIG. 5.
Figure 7:
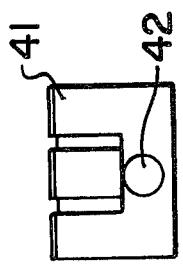
FIG. 7 is a side view of a resilient member for use with the half shell shown in FIGS. 5 and 6.
Figure 5:
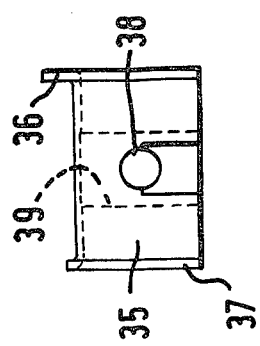
FIG. 5 is a side view of one embodiment of a half shell for use in mounting a supporting bracket on the collapsible tube.

Mounted on the tube 14 at the section 17 are a pair of half shells 35. As shown in FIGS. 5 and 6, each half shell is provided at one end with a large flange 36 and at the other end with a smaller flange 37. A pair of projections 38 are provided intermediate the ends of the half shell and a groove 39 is provided in the central region on the inner curved surface, said groove having a width approximately equal to one third of the length of the half shell. An arcuate member 41 of resilient material is designed to be fitted over each of the half shells 35. As shown in FIGS. 7 and 8, each member 41 is provided with a pair of apertures 42 designed to cooperate with the projections 38 and by means of which the members 41 may be held in a stressed condition on the half shells 35.

Figure 2:
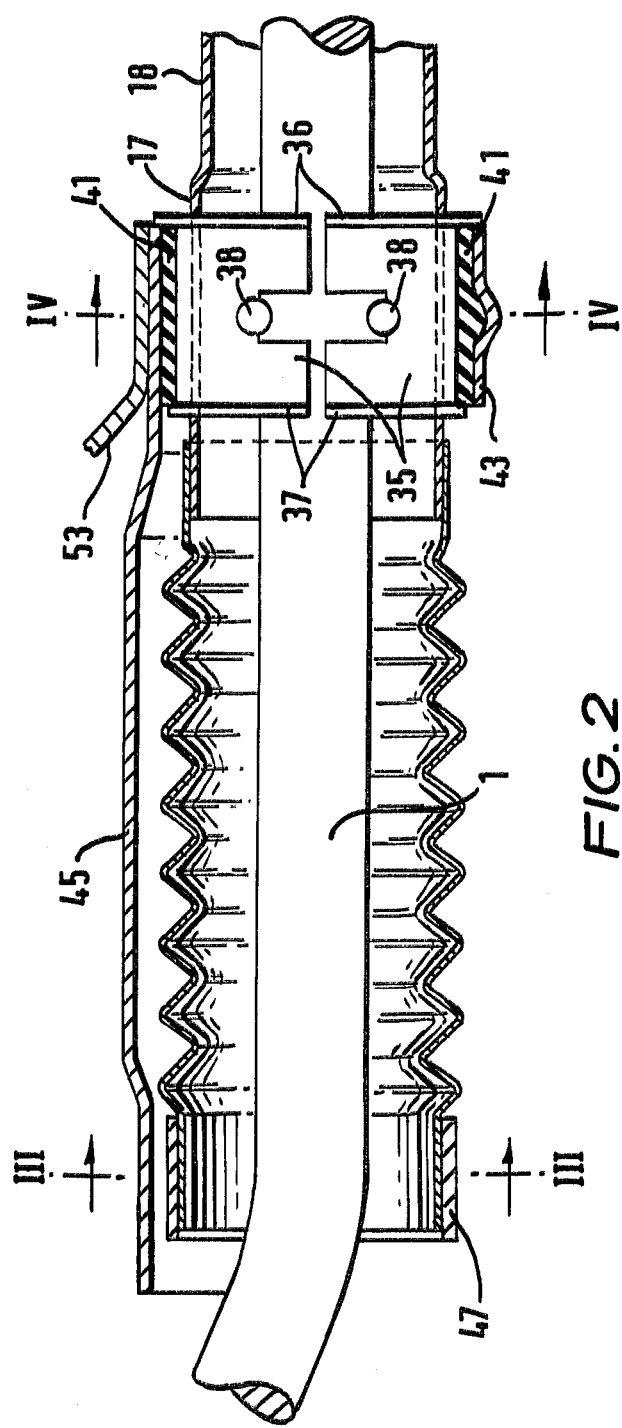
FIG. 2 is a longitudinal section through part of the steering column assembly shown in FIG. 1.
Figure 4:
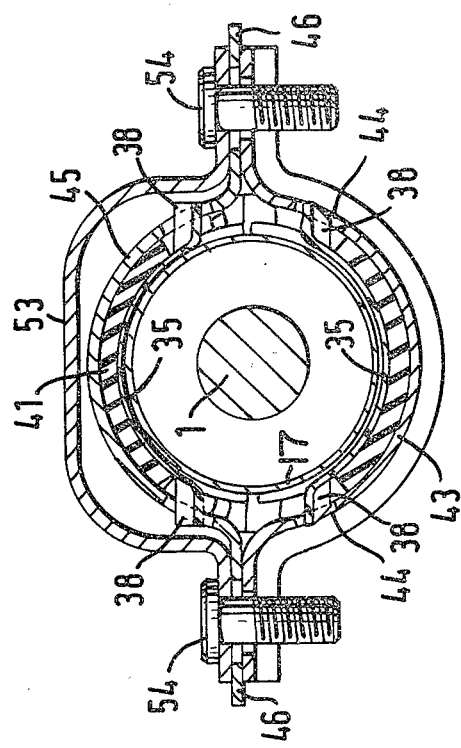
FIG. 4 is a section taken on the line IV—IV in FIG. 2 in the direction of the arrows.
Figure 3:
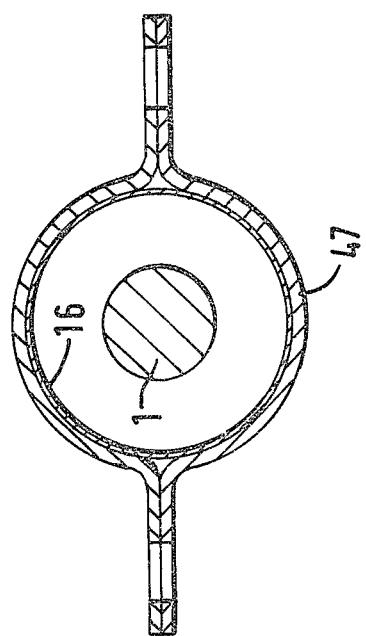
FIG. 3 is a section taken on the line III—III in FIG. 2 in the direction of the arrows.

The half shells 35 with the resilient members 41 fitted thereon are clamped to the section 17 of the tube 14 by a bracket 43 which is bolted to flanges 46 extending from a channel section 45. The bracket 43 is provided with apertures 44 through which the projections 38 extend. The channel section 45 may be provided with similar apertures as shown in FIG. 4. As can be clearly seen from FIG. 2, the free end of the convoluted section 16 of the tube 14 is not secured to the shaft section 1 and a bracket 47 is secured to this end, e.g., by welding. The bracket 47 is secured to the flanges 46 of the channel section 45 by bolts 48 (FIG. 9).

As shown in FIGS. 1 and 9, a channel member 49 is secured to the flanges 46 of the channel section 45 and is designed to be bolted to the fire wall or dash panel 50 of a vehicle. The brake and clutch pedals 51 are pivotally mounted on the channel member 48 as shown in FIG. 1. A bracket 53 which is bolted to the cowl top or instrument panel 52 of the vehicle is secured by bolts 54 to the flanges 46 and the bracket 43, which bolts pass through apertures in the flanges and brackets and are secured in position by nuts 55 (FIG. 9).

Mounted on the collapsible tube 14 at the section 19 is a steering locking mechanism 56 which is secured in place by a bracket 57 and bolts 58. An aperture (not shown) is provided in the section 19 through which a spigot 59 of the mechanism 56 can pass into locking engagement with the slot 10 in the sleeve 9 on the shaft section 1. By the operation of a key inserted in the lock mechanism 56, the spigot 59 may be moved radially until it projects into the slot 10 in the sleeve 9. Inasmuch as the sleeve 9 is fast with the steering shaft section 1, the steering shaft will be prevented from rotation when the spigot 59 is situated in the slot 10. Finally, covers 61 and 62 are provided to enclose, in a conventional manner, the steering locking mechanism 56, the direction indicator unit 25 and the sleeve 23.

OPERATION

In the event an impact load is imposed on the steering wheel 29, the shaft section 1 will be forced towards the steering gear box whereby the pins 5 will slide through the bushes 8 until they move clear of the bushes and the sections 1 and 2 of the steering shaft are disconnected. At the same time, the tube 14 is forced to slide axially through the half shells 35 while the convoluted section 16 is axially compressed. Once the section 17 has been forced through the half shells 35, the reduced diameter section 18 can pass freely therethrough and the impact load on the steering wheel is absorbed entirely by the axial compression of the convoluted section 16.

The resistance to axial sliding of the pins 5 through the bushes 8 and the section 17 through the half shells 35 is determined such that, in the event of only a slight impact on the steering wheel, no axial movement takes place whereas, in the event of a major impact load on the steering wheel the resistance to axial sliding is overcome.

The half shells 35 are preferably made of a plastics material and subtend an arc of slightly less than 180° whereby manufacturing tolerances of the tube 14 can be taken up. The resilient members 41 are desirably made of natural or synthetic rubber and ensure that the channel section 45 and bracket 43 grip the half shells and hold them in position by taking up manufacturing tolerances in these components. The flanges 36 and the engagement of the projections 38 in apertures 44 in the bracket 43 prevent the half shells 35 from moving with the axial movement of the tube 14 and thus ensure that the tube 14 must slide through the half shells 35.

It will be seen that the present invention provides a compact and easy to assemble steering column assembly which absorbs energy when an impact load is imposed on the steering wheel.

We claim:

1. A steering column assembly for a motor vehicle comprising a steering shaft having an upper shaft section connected to a steering wheel and a lower shaft section constructed to be connected to a steering gear;

said upper and lower shaft sections being rigid and non-collapsible under large impact loads;

the lower end of said upper shaft section having a crank portion spaced apart from the axis of rotation of said upper shaft section;

a first plate secured to the end of said crank portion arranged perpendicular to the axis of rotation of said upper shaft;

said first plate having an elongated slot therethrough;

a pair of pins secured to said first plate extending in a direction toward the upper end of said upper shaft section;

said pins being situated on diametrically opposite sides of said axis of rotation of said upper shaft section;

the upper end of said lower shaft section extending through said slot in said first plate of said upper shaft section;

said upper end of said lower shaft section being coaxial with the axis of rotation of said upper shaft section;

a second plate having portions extending radially in opposite directions secured to the upper end of said lower shaft section;

said radially extending portions of said second plate having a pair of holes situated with their centers on diametrically opposite sides of said axis of rotation of said upper shaft portion;

a pair of rubber bushes seated in said holes of said second plate;

said pins secured to said first plate being slidably received in said bushes of said second plate;

a collapsible tube surrounding said upper shaft section;

said tube having a lower portion of convoluted construction;

the lower end of said lower portion of said tube having a first bracket affixed thereto;

said first bracket having radially extending bracket portions;

said tube having an intermediate portion with a smooth exterior surface;

a pair of arcuate elastomeric members surrounding said intermediate portion of said tube above the upper end of said convoluted lower tube portion and in slidable engagement therewith;

a pair of arcuate brackets enclosing said pair of arcuate elastomeric members;

an elongated rigid sheet metal support secured at its forward end to a firewall of a motor vehicle;

a brake control pedal pivotally connected to said rigid sheet metal support;

said sheet metal support having spaced portions bolted to said first bracket and to said arcuate brackets;

a second sheet metal support secured to an instrument panel of said vehicle and bolted to said arcuate brackets;

said tube having an upper portion with a smooth exterior surface spaced upwardly of said intermediate tube portion;

said upper tube portion having a lesser outside diameter than said intermediate portion;

said upper tube portion supporting first steering shaft lock means and enclosing second steering shaft lock means secured to said steering shaft;

said second lock means being engageable by said first lock means;

said steering column assembly being constructed to absorb a forwardly directed impact load on said steering wheel by (a) forward axial displacement of said upper steering shaft section relative to said lower steering shaft section whereby said pins slidingly disengage from said bushes and said first plate of said upper shaft section slides along said lower shaft section, (b) axial displacement of said intermediate tube portion through said arcuate elastomeric members and (c) plastic deformation of said convoluted lower portion of said tube;

said first bracket and said sheet metal support being constructed to rigidly support said lower end of said tube during the plastic deformation of said convoluted lower tube portion.

* * * * *